Feb. 25, 1947.  E. C. SEWARD  2,416,352
CARGO HANDLING DEVICE
Filed Aug. 4, 1944   3 Sheets-Sheet 2
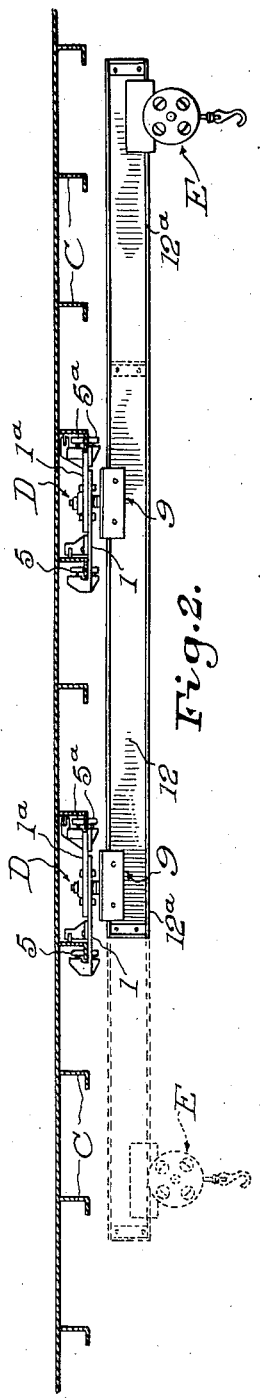
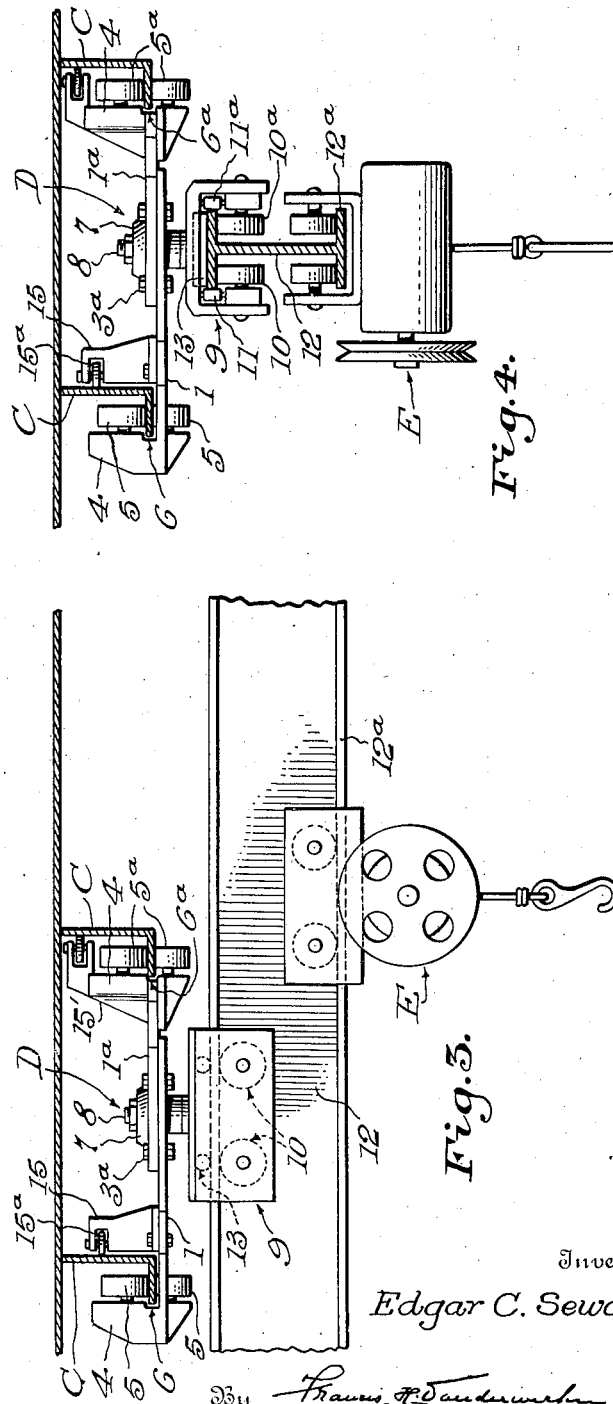
Inventor
Edgar C. Seward

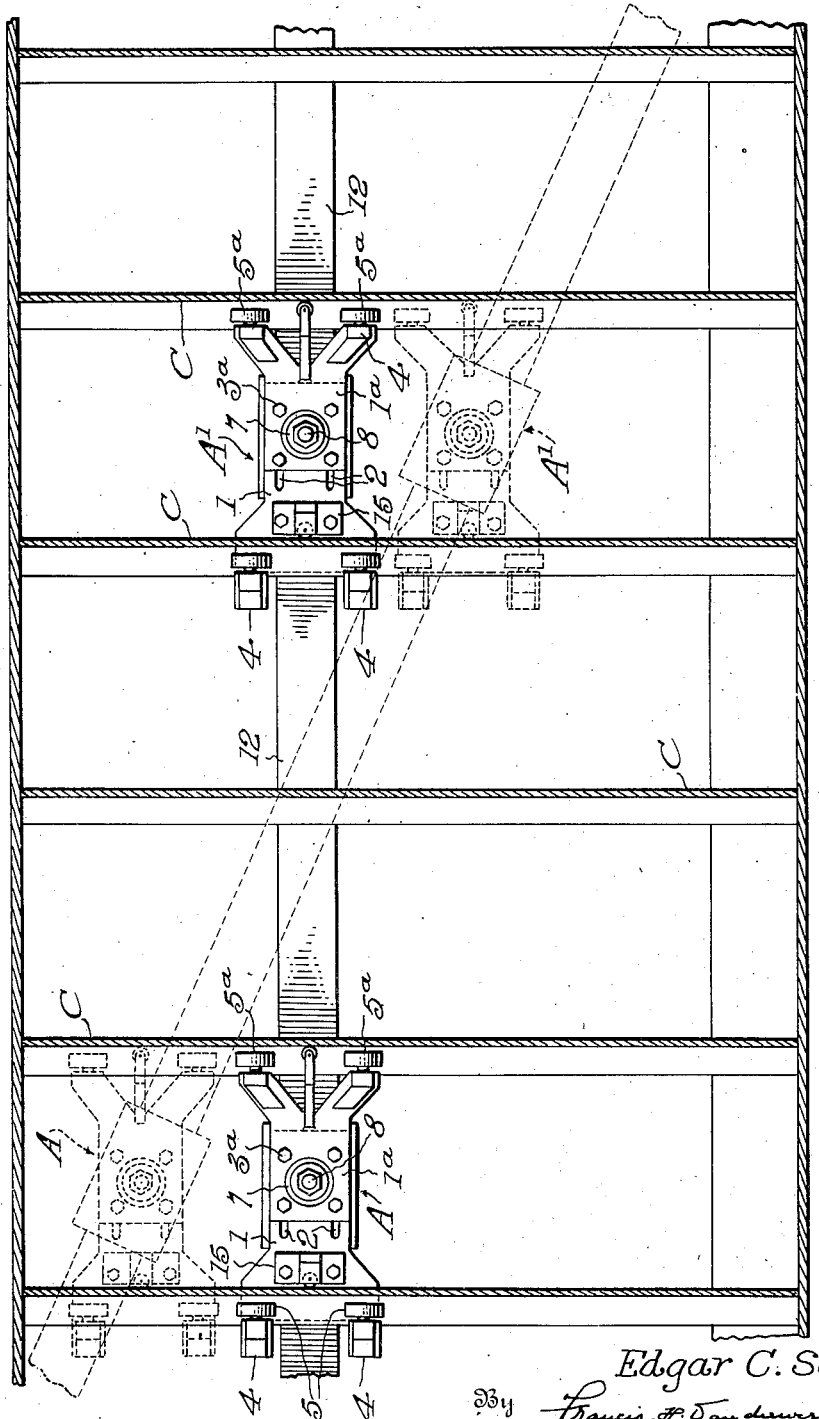

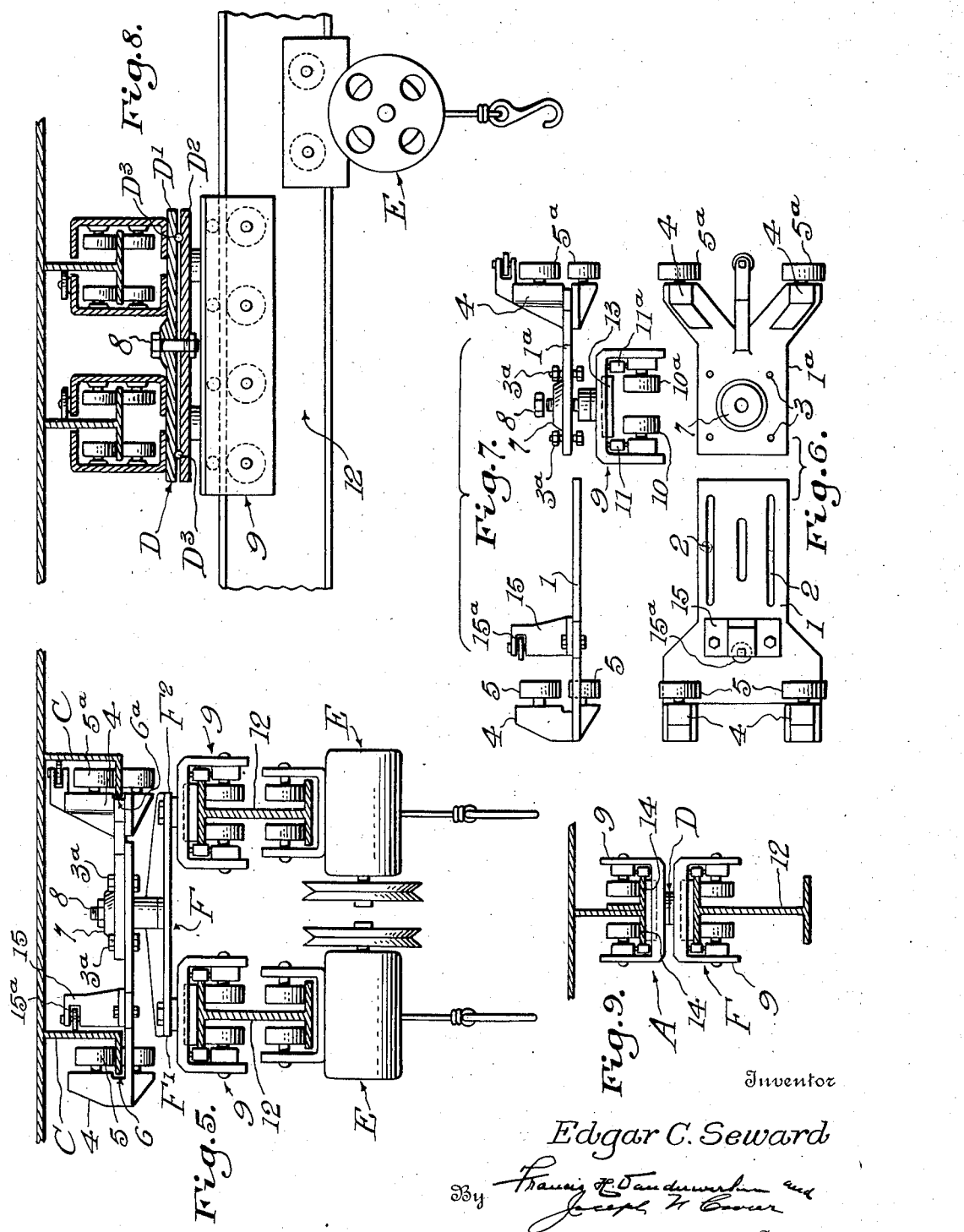

Patented Feb. 25, 1947

2,416,352

UNITED STATES PATENT OFFICE 2,416,352

CARGO HANDLING DEVICE

Edgar C. Seward, South Arlington, Va.

Application August 4, 1944, Serial No. 548,123

3 Claims. (Cl. 104—107)

(Granted under the act of March 3, 1883, as amended April 30, 1928; 370 O. G. 757)

The invention described herein may be manufactured and used by or for the Government for governmental purposes, without payment to me of any royalty thereon.

This invention relates to a cargo handling device for use aboard ship, and more particularly to that type of cargo handling device comprising a traversing hoist which may be mounted on the overhead deck beams in the hold of a ship for transferring cargo to and from the square of the hatch to other positions in the hold of the ship.

While particularly applicable for use in the hold of a ship, it will be obvious that this construction may be used in other installations, as warehouses, for example, where overhead trackways are provided.

One of the objects of this invention is to provide a cargo handling hoist construction in which the cargo boom may be adjusted to various angular positions with respect to the overhead tracks in such a manner as to reach into any adjacent corner of a ship's hold for the purpose of transferring cargo to and from the square of the hatch for loading or unloading purposes. To the attainment of this end, the invention comprises generally a plurality of trolley units which are mounted at spaced points for travel on overhead tracks. Each trolley unit carries a downwardly extending trolley which, in turn, supports a cargo or load handling boom. The load handling boom carries a trolley hoist. Each downwardly extending trolley is swivelly connected to its respective trolley unit in such a manner as to permit each trolley unit to be movable on its respective track independently of the other trolley unit. By this means, it is possible to adjust the cargo boom angularly with respect to the direction of travel of the respective trolley units and the cargo boom may be extended into any corner of the ship's hold in a manner which will hereafter appear. The load boom may thus be arranged for cargo handling either at a right or acute angle with respect to the overhead beams.

This object and other objects of the invention will further appear as the description proceeds.

For a complete understanding of this invention, reference is made to the accompanying drawings in which:

Figure 1 represents a plan view of the device as installed in the hold of a ship, parts of the ship's construction being shown in horizontal section.

Figure 2 represents a side elevation of the device as shown in Figure 1.

Figure 3 represents an enlarged side elevation of one trolley unit as shown in Figure 2, with a portion of the ship's construction shown in vertical cross-section.

Figure 4 is a view similar to Figure 3 with the cargo handling beam turned on its swivel at right angles to its position as shown in Figure 2, with the beam in cross-section.

Figure 5 is an end view of the device, with parts of the ship's construction shown in vertical cross-section, illustrating a modified form of the invention.

Figure 6 is a plan view of the separable clamping or securing device which is used to fasten the cargo handling device to the overhead tracks.

Figure 7 is a side elevation of the device shown in Figure 6.

Figure 8 is a further modified form of the device shown in Figure 3.

Figure 9 represents still an additional modified form in which T-irons are substituted for the conventional angle irons now used as deck beams in ship construction, and in which the upwardly extending trolley unit is modified to conform to the changed construction, eliminating the clamping device shown in Figures 6, 7.

The invention comprises a plurality of upwardly extending trolley units or carriages A, A¹ which are movably mounted on the horizontal base flanges of overhanging deck beams C of a ship's hold. Each trolley unit comprises overlapping adjustable clamping devices or plates, 1 and 1a. One of these adjustable devices, as for example 1, may be provided with slots 2, which register with the bolt holes, 3, of the corresponding device 1a when the two parts are adjusted and aligned and by means of which the clamping device is adjusted and made secure. Bolts 3a are provided to clamp the adjustable parts together, as more particularly shown in Figs. 3 and 4. By this means, the device can be accommodated to varying distances between the overhead tracks or deck beams C. Each clamping device is provided at one end with a pair of spaced brackets, 4, which extend above and below the surface of the clamping device proper and each bracket carries spaced trolley wheels 5, 5a between which the base flanges of deck beams C are received, as more particularly illustrated in Figs. 3 and 4. Each bracket is also suitably notched at 6, 6a to receive the base flange of the deck beams C. A supplemental bracket 15, as shown in Figures 1 and 5, is bolted to clamping plate 1 and is provided with a suitable guide roller 15a, engaging the side wall of the deck beam to guide the clamping device and secure it against running off its track. A device 15' performing a similar function, is provided for the plate 1a.

As shown in Figures 4 and 7, the clamping or securing device 1, 1a is provided with a swivelling head generally indicated as at D. This head comprises a circular plate, 7, which may be formed integrally with the clamping device, or separably therefrom, and otherwise suitably secured to the clamping device. Bolts 3a are provided to secure together the adjustable parts of said clamping device and a king pin 8 is passed through said plate and clamping device. A downwardly extending yoke 9 is swivelly secured to the lower end of said king pin 8 and is provided with spaced, horizontally running trolley wheels 10, 10a on each leg thereof, respectively, and has vertically disposed guide rollers 11, 11a between which the boom 12 is supported and guided. The cargo boom, which may be an I-beam 12, is mounted so that it is carried by the trolley wheels 11, 11a of the downwardly extending yoke 9. The base of each yoke 9 is also provided with horizontally disposed, spaced, anti-friction rollers 13, which guide and facilitate the movement of the load boom through these inverted trolleys, particularly when under a load. The load boom 12, which may be projected on the trolley wheels 10, 10a in the direction of its longitudinal axis, carries a traversing hoist, generally indicated at E, which may be of any conventional construction, preferably an electrically geared hoist, so that it may be freely moved to and fro on the base flanges 12a of the cargo boom 12.

In present ship construction, such as the Liberty ship, angle irons are welded to the under side of the deck and form the usual overhead deck beam. The device as described is intended for application to ships of such construction although its use is not limited thereto. It will be understood that in such constructions as shown in Figure 9 the base flange of such deck beam angles may be suitably cut out either adjacent the square of the hatch or the hull of the ship for the purpose of mounting this cargo hoist. The construction shown in Figure 7 may be affixed to the deck beams at any time without any necessity for any alteration of the deck beams. Such a construction would be suitable where it was intended that the hoist may be moved from one hold to another. If, however, it is intended that this hoist construction remain as a permanent installation in each hold, the overhead trolley unit and clamping device, without more, could be installed during the construction of the ship, the remaining portions of the assembly to be attached when necessary.

In Figure 5, the construction has been modified so as to mount two booms and hoists on a single trolley unit or overhead carriage, to speed up loading and unloading. In this form of the invention an inverted T-head F is swivelled from the clamping device 1, 1a, the leg of the T cooperating with the clamping device 1, 1a and the plate D to form the swivel connection. The arms of the T at F¹—F² support the downwardly extending trolley yokes 9 which, in turn, support the cargo booms 12 and hoists E.

The several forms of the invention heretofore described will efficiently handle heavy drafts of cargo. The modified construction shown in Figure 8 is adaptable for lighter drafts. In this modification the swivel connection D is composed of circular plates D¹, D² spaced by a ball race D³ of any suitable construction, the plates being joined in swivelling relation by a king pin bolt. Short channels, or other suitable structural shapes, may be welded or otherwise suitably secured to the upper surface of the plate D¹ and are provided with the necessary trolley and guide wheels, as disclosed in the other forms of the invention, for mounting on the overhead beams. Obviously, plates D¹, D² may be of a weight and diameter determinable by the exigencies of the situation. To the plate D² the downwardly extending trolley yoke 9 is suitably secured and this yoke supports the cargo boom 12 and hoist E in a manner heretofore fully described. In this form of the invention, one trolley unit, such as contemplated in Figure 1 is eliminated, and this construction further has the advantage of being rotatable a full 360° about the axis of the king pin 8.

As shown in Figure 9, T-irons may be substituted for the angle irons of the deck beams of the ship, and in such construction, the clamping device referred to above could be eliminated. Instead, identical trolley units could be provided so that each upwardly extending trolley A would ride on the base flanges 14, of the T-iron and the downwardly extending trolley F could be connected thereto by means of a suitable swivel joint D to carry the load boom in the manner shown in this figure.

It will be obvious from this construction, that because of the swivel joint D between the yokes 9 and the overhead trolley unit and clamping device 1, 1a, it is possible to move either one of the trolleys A, A¹ on its respective trackway independently of the other, the swivel joint D, permitting the boom to assume an angular relationship, other than that of a right angle, with respect to the overhead tracks, as shown in Figure 1. The cargo boom 12 may be projected either to the right or to the left, as desired, riding on the trolley wheels 10, 10a so as to reach into any adjacent corner of the ship's hold, engage a draft of cargo, and move it to the square of the hatch, or vice versa.

If it were desired to move the cargo handling device from one side of the hold or hatch to the other, this could be quickly and efficiently accomplished by the provision of a third trolley unit, such as A, which could be suspended in the desired position on the other side of the square of the hatch. The cargo boom 12 could then be adjusted so as to point toward the third trolley unit and could be moved into engagement therewith, the progressive movement of said cargo boom finally disengaging it from one of the trolley units in which it was previously mounted, at which time said disengaged trolley unit could be shifted to the other side of the ship and quickly slung on its proper trackway to engage the free end of the cargo boom which is moved in its direction. It will be understood that changes in the construction of the invention may be made without departing from the spirit thereof as defined by the appended claims.

I claim as my invention:

1. A cargo handling device for overhead trackway systems comprising two L-shaped tracks, similarly and parallelly disposed and including coplanar horizontal treads and vertical webs, wheels on the ends of a trolley frame, said wheels being mounted on said tracks and being on horizontal axes to engage the horizontal treads of the tracks, brackets on said frame and guide rollers mounted on said brackets, said guide rollers being on vertical axes and disposed between the tracks to engage the vertical webs of their respective L-shaped tracks.

2. A cargo handling device for overhead trackway systems comprising a pair of tracks, similarly and parallelly disposed and including coplanar horizontal treads and vertical webs, wheels on the ends of a trolley frame, said wheels being mounted on said tracks and being on horizontal axes to engage the horizontal treads of the tracks, overlapping adjustable clamping devices mounted on said frame, said clamping devices connected to adjust the trolley frame to different gauges of tracks, brackets mounted on said clamping devices and guide rollers mounted on said brackets, said guide rollers being on vertical axes and disposed between the tracks to engage the vertical webs of their respective tracks.

3. A cargo handling device for overhead trackway systems comprising two tracks, similarly and parallelly disposed and including coplanar horizontal treads and vertical webs, wheels on the ends of a trolley frame, said wheels being mounted on said tracks and being on horizontal axes to engage the horizontal treads of the tracks, overlapping adjustable plates mounted on said trolley frame, said adjustable plates connected to adjust the trolley frame to different gauges of tracks, brackets mounted on said plates, guide rollers mounted on the brackets and disposed between the tracks to engage the vertical webs of their respective tracks, means for locking said overlapping plates in adjusted position, and a yoke supporting king pin swivelly mounted on said plates.

EDGAR C. SEWARD.

REFERENCES CITED

The following references are of record in the file of this patent:

UNITED STATES PATENTS

| Number | Name | Date |
| --- | --- | --- |
| 871,255 | Bragg | Nov. 19, 1907 |
| 1,395,749 | Thorn | Nov. 1, 1921 |
| 1,758,580 | Moore | May 13, 1930 |
| 1,752,026 | Phillips | Mar. 25, 1930 |
| 1,443,382 | Rapier | Jan. 30, 1923 |

FOREIGN PATENTS

| Number | Country | Date |
| --- | --- | --- |
| 141,914 | British | Apr. 29, 1920 |